(No Model.)
F. J. MORGAN.
CULINARY VESSEL HANDLE.
No. 515,351. Patented Feb. 27, 1894.
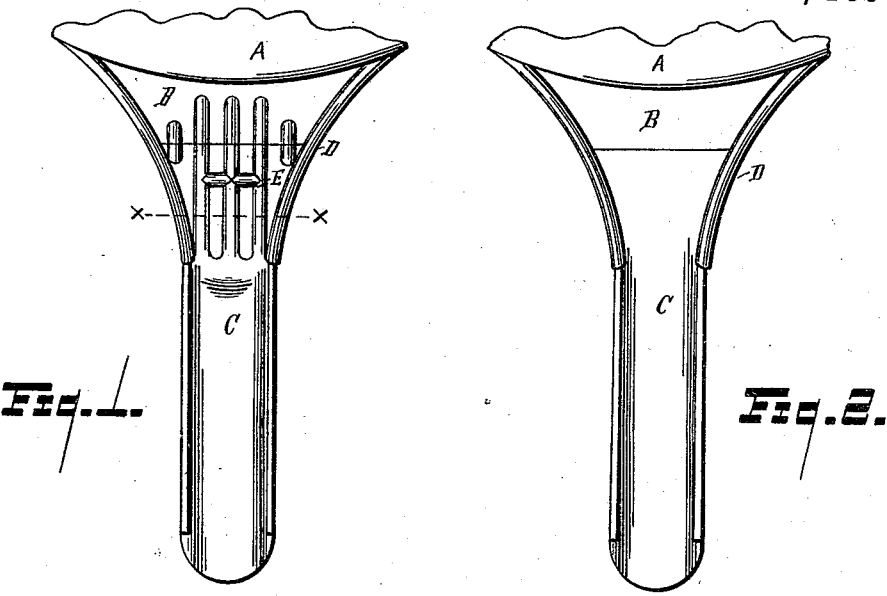
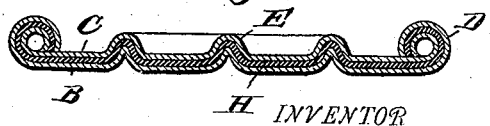
WITNESSES
Newton G. Leslie
Frank M. Spaulding
INVENTOR
Frank J. Morgan
By Lucius C. West
Atty
THE NATIONAL LITHOGRAPHING COMPANY,
WASHINGTON, D. C.

United States Patent Office.

FRANK J. MORGAN, OF KALAMAZOO, MICHIGAN.

CULINARY-VESSEL HANDLE.

SPECIFICATION forming part of Letters Patent No. 515,351, dated February 27, 1894.

Application filed February 27, 1893. Serial No. 463,952. (No model.)

*To all whom it may concern:*

Be it known that I, FRANK J. MORGAN, a citizen of the United States, residing at Kalamazoo, county of Kalamazoo, State of Michigan, have invented a new and useful Culinary-Vessel Handle, of which the following is a specification.

This invention relates to culinary vessels which are provided with handles made separate from the material of which the vessel is composed and attached thereto.

The object of the invention consists in certain improvements designed to add to the utility and facilitate the manufacture, all as more particularly described below in detail.

In the drawings forming a part of this specification, Figure 1 is an inverted plan view, showing the vessel broken; Fig. 2 the same, showing a change; and Fig. 3 is an enlarged cross section on line $x$—$x$, in Fig. 1, showing a change.

Referring to the lettered parts of the drawings, A is a broken portion of a culinary vessel, at one side of the same, and bottom upward. These vessels are first cut out of sheet steel and then pressed into form, and when cut out a short projection, B, is left integral with the vessel, at the side thereof, the edges of said projection converging from the vessel toward the end. The attaching end of the handle, C, is formed with diverging sides, so as to conform to the shape of the short projection, B. The handle, C, is rolled over at the edges and the widened end is lapped on to the projection and the edges of the latter folded over and pressed down upon the folded edges of the handle C, as at D. By thus making the edges of the projection B converging toward the outer end and the edges of the handle C diverging at the inner end, so that the edges of the lapping parts register with each other, and by folding and pressing the edges of the projection over on to the edges of the widened end of the handle, the handle is made practically as rigid and strong as though all made from one piece; the handle part, C, cannot be pushed in nor drawn out, and still I am enabled to have the handle project at a horizontal or an inclined angle, or on a gentle circular slope, and thus obviate the necessity of making opposing curves in the lapping parts of the handle.

Figs. 1 and 2 illustrate the invention as thus far described.

In Figs. 1 and 3 the lapping parts of the projection of the handle are corrugated by being pressed together between dies, as at E. This gives additional strength, making the handle more rigid than without the corrugations, as in Fig. 2; however, the plan in Fig. 2 is practical.

In forming the corrugations, one part of the metal is forced into the other, and thus guards against lateral canting of the handle, in case the rolled edges should be imperfectly, carelessly or loosely folded and pressed.

In Fig. 3, at H is shown a piece of asbestus or other equivalent flexible material which is a non-conductor of heat, placed between the lapping parts of the projection B and the handle C, and rolled with them at the edges, D. This asbestus, H, or its equivalent, being a non-conductor of heat, keeps the handle part C cooler than would be the case if it came in direct contact with the projection B of the vessel.

Of course, for the purposes of my invention, the short projection B may or may not be integral with the vessel, A.

Having thus described my invention, what I claim as new, and desire to secure by Letters Patent of the United States, is—

1. A culinary vessel provided with a short projection, the edges of which converge from the vessel toward the outer end, in combination with a separate handle part, the edges of the inner end of which diverge, the widened end of the handle being lapped on to the converging projection and attached thereto by rolling and pressing the edges of the latter over on to the former; substantially as set forth.

2. A culinary vessel provided with a short projection converging from the vessel toward the end, in combination with a separate handle part having a widened end lapping on to said projection and attached thereto by rolling and pressing the edges together, and a suitable flexible material which is a non-conductor of heat between the lapping parts; substantially as set forth.

3. A culinary vessel provided with a short projection, in combination with a separate handle part lapping on to said projection and attached thereto by rolling and pressing the edges together, the lapping parts of the metal having corrugations formed therein; substantially as set forth.

In testimony to the foregoing I have hereunto subscribed my name in the presence of two witnesses.

FRANK J. MORGAN.

Witnesses:
   JOHN P. OGGEL,
   J. M. CRAMER.